United States Patent
Förster et al.

(10) Patent No.: US 12,405,143 B2
(45) Date of Patent: Sep. 2, 2025

(54) METHOD FOR OPERATING A MAGNETIC-INDUCTIVE FLOWMETER AND A CORRESPONDING MAGNETIC-INDUCTIVE FLOWMETER

(71) Applicant: KROHNE Messtechnik GmbH, Duisburg (DE)

(72) Inventors: Jan Förster, Essen (DE); Nicolaus Mathies, Moers (DE)

(*) Notice: Subject to any disclaimer, the term of this patent is extended or adjusted under 35 U.S.C. 154(b) by 308 days.

(21) Appl. No.: 18/340,317

(22) Filed: Jun. 23, 2023

(65) Prior Publication Data

US 2023/0417585 A1 Dec. 28, 2023

(30) Foreign Application Priority Data

Jun. 24, 2022 (DE) .......................... 102022115787.3

(51) Int. Cl.
*G01F 1/58* (2006.01)

(52) U.S. Cl.
CPC .............. *G01F 1/588* (2013.01); *G01F 1/586* (2013.01)

(58) Field of Classification Search
None
See application file for complete search history.

(56) References Cited

U.S. PATENT DOCUMENTS

| 5,824,914 A | * | 10/1998 | Seppa | G01F 1/588 73/861.11 |
| 6,594,613 B1 | | 7/2003 | Ley et al. | |
| 2001/0008993 A1 | * | 7/2001 | Bottomfield | G01H 1/003 702/56 |
| 2006/0235634 A1 | * | 10/2006 | Florin | G01F 1/60 702/75 |
| 2013/0006544 A1 | | 1/2013 | Rovner | |

FOREIGN PATENT DOCUMENTS

| DE | 2744845 A1 | 4/1979 |
| DE | 102005018179 A1 | 10/2006 |
| EP | 1192421 B1 | 12/2009 |
| JP | H10253412 A | 9/1998 |

* cited by examiner

*Primary Examiner* — Suman K Nath
(74) *Attorney, Agent, or Firm* — Patrick D. Duplessis

(57) ABSTRACT

A method for operating a magnetic-inductive flowmeter includes: passing a magnetic field through a measuring tube having a medium flowing therethrough; tapping a voltage induced in the medium as a measuring signal; determining a flow measurement value from the measuring signal; generating measuring signal samples in respective measuring windows that periodically repeat at a measuring window frequency; determining an averaged flow measurement value from the measuring signal samples; obtaining an amplitude spectrum of the measuring signal samples by a frequency analysis thereof; determining an interference peak in the amplitude spectrum and an associated interference peak frequency that is not a multiple of the measuring window frequency; identifying a critical measurement situation by checking whether the interference peak frequency falls below a critical frequency distance to a multiple of the measuring window frequency; and in the presence of a critical measurement situation, determining and setting a new measuring window frequency.

12 Claims, 6 Drawing Sheets

METHOD FOR OPERATING A MAGNETIC-INDUCTIVE FLOWMETER AND A CORRESPONDING MAGNETIC-INDUCTIVE FLOWMETER

TECHNICAL FIELD

The invention relates to a method for operating a magnetic-inductive flowmeter with a measuring tube for guiding a medium, with a magnetic field generator for generating a magnetic field passing through the measuring tube perpendicular to the direction of flow of the medium, with a pair of electrodes for tapping an electrical voltage induced in the medium in the measuring tube as a measuring signal, and with a control and evaluation unit for determining a flow measurement value from the measuring signal, wherein the measuring signal is sampled several times in a measuring window periodically repeating at a measuring window frequency and at least one averaged flow measurement value is determined from the multiple sampled measuring signals from at least one measuring window. Furthermore, the invention also relates to a magnetic-inductive flowmeter that performs a corresponding method.

BACKGROUND

The previously mentioned flowmeters based on the magnetic-inductive measuring principle have been known for decades. Consequently, methods for operating such flowmeters as previously described have also been known for a long time. The magnetic-inductive measuring principle is based on the concept of the action of force on charge carriers moving perpendicular to a magnetic field or having a component of motion perpendicular to the magnetic field in question (Lorentz force). In order to perform a flow measurement using this principle, the medium carried in the measuring tube must have a certain electrical conductivity. The faster the medium moves through the measuring tube and thus also through the magnetic field generated by the magnetic field generator, the greater the separation of charge carriers in the flowing medium of the corresponding measuring tube section, and the stronger an electric field caused by the charge separation, which is formed between the electrodes of the measuring tube and can be picked up as an electric voltage between the electrodes. The measuring voltage between the electrodes develops proportionally to the flow velocity, at least during the period in which the magnetic field is constant and the conductivity of the medium or the charge carrier concentration in the medium is constant.

The measuring window mentioned at the beginning is a period of time within which a plurality of measured values is captured, namely the electrical voltage sampled across the pair of electrodes. A flow measurement value is then determined from the plurality of sampled measuring signals within a measuring window; often the determined measuring values are averaged, for example, to achieve an improved signal-to-noise ratio.

During the operation of magnetic-inductive flowmeters in typical process engineering systems, it has been noticed occasionally and practically by chance that flow measurement values are sometimes subject to a systematic, slow periodic fluctuation, wherein the periodicity can be present in wide ranges, for example in the range of a few seconds, a few tens of seconds or even minutes. The origin of the fluctuations and the timing are not readily apparent.

SUMMARY

The object of the present invention is to provide a method for operating a magnetic-inductive flowmeter, and also to provide a corresponding magnetic-inductive flowmeter for detecting and avoiding the problem of systematically occurring fluctuations in the flow measurement value.

According to the invention, it has first been recognized that the relatively slow periodic fluctuations of the measuring signal, which thus extend over many measuring windows, are based on a relatively fast periodic fluctuation of the measuring signal superimposed on the DC component of the measuring signal, precisely when the periodicity of the superimposed, relatively fast fluctuating measuring signal corresponds to a whole fraction of the period of the periodically repeating measuring window, respectively if the frequency of the relatively fast fluctuating measuring signal superimposed on the DC component of the measuring signal is a multiple of the measuring window frequency. In this case, a beat effect occurs, resulting in a systematic, slowly varying measurement error.

The relatively fast fluctuation of the measuring signal superimposed on the DC component of the measuring signal can have quite different causes, wherein the physical reason of the superimposed measuring signal fluctuation is not important.

A typical cause for the occurrence of fast superimposed fluctuations in the measuring signal is the effect of pumps, whose influence is propagated via the transported medium to the magnetic-inductive measuring device. Due to their design, pumps usually do not convey the medium completely uniformly, but in a pulsating manner. In this case, the volume flow of the conveyed fluid consists of a steady component, which corresponds to the nominally conveyed volume flow of the pump, and an approximately harmonic component, which originates from the physical conveying principle of the pump. For example, a pump blade spinning past the pump outlet will cause a momentary increase in flow rate, followed immediately by a momentary decrease in flow rate. In addition to varying the flow rate, a pump also periodically varies the pressure within the moving fluid. A variation in pressure can also affect the voltage captured by the pair of electrodes and thus the measuring signal.

Systematic, low-frequency fluctuations of the flow measurement value, which are based on higher-frequency superimposed fluctuations of the measuring signal, are intrinsically difficult to detect, since they occur, for example, only in certain operating states, such as certain flow rates of connected pumps, or because pumps—or corresponding devices causing fluctuations—are switched on only intermittently. The system operator is often not even aware that such an error can occur; to this extent, for example, no specific check is made for such fluctuations in the flow measurement value, i.e. fluctuations based on beat effects, when a system is commissioned.

The idea of the present invention is to first detect whether there is a frequency component in the sampled measuring signal which is in the range of a multiple of the measuring window frequency and, if this is the case, to shift the measuring window frequency accordingly so that the beat effect is avoided. By appropriately shifting the measuring window frequency, it is of course not avoided that the measuring signal has the superimposed higher-frequency fluctuations, but it is avoided that these are systematically reflected in the low-frequency flow measurement value, the fluctuations are then rather noticeable in high-frequency around the actual flow measurement value and disappear if an averaging of the flow measurement values is already carried out over a few measuring windows, which is just not possible in the case of beat effect.

In the method for operating a magnetic-inductive flowmeter, it is therefore first provided that an amplitude spectrum of the sampled measuring signals of at least one measuring window is obtained by a frequency analysis of the multiple sampled measuring signals of the measuring window. In a well-established design, a Fast Fourier Analysis of the sampled measurement values is performed for this purpose (FFT).

Then, according to the invention, it is provided that at least one interference peak in the amplitude spectrum and the associated interference peak frequency are determined by a peak detection, i.e. such a peak whose peak frequency is not a multiple of the measuring window frequency.

A critical measuring situation is identified by checking whether the determined disturbance peak frequency falls below a specified critical frequency distance to a multiple of the measuring window frequency. Finally, if a critical measuring situation exists, a new measuring window frequency is determined and set as the new measuring window frequency so that, as a result, there is no longer a critical measuring situation.

In the magnetic-inductive flowmeter according to the invention, the method is implemented by appropriate design of the control and evaluation unit, which is then set up to perform the frequency analysis in the operating state, the peak detection described above, the identification of a critical measuring situation, and finally the determination and setting of a new measuring window frequency, so that in the result there is no longer a critical measuring situation.

A preferred design of the method is characterized in that the check whether the determined interference peak frequency falls below a predetermined critical frequency distance to a multiple of the measuring window frequency is calculated by calculating the amounts of the differences of the determined interference peak frequency to the multiple of the measuring window frequency and the amounts of the differences are compared in each case with the predetermined critical frequency distance.

Of course, it is of interest how a predetermined critical frequency distance is to be reasonably dimensioned. In this respect, a particularly preferred design of the method is characterized in that the predetermined critical frequency distance is selected to be no smaller than $1/25$ of the measuring window frequency, preferably no smaller than $1/50$ of the measuring window frequency, and/or in that the predetermined critical frequency distance is selected to be no larger than $1/10$ of the measuring window frequency, preferably no larger than $1/6$ of the measuring window frequency.

In a further design of the method, it has turned out to be useful that the new measuring window frequency is selected to be greater than the existing measuring window frequency and/or that the new measuring window frequency is selected to deviate as little as possible from the existing measuring window frequency. A deviation from the previously valid measuring window frequency that is as small as possible has proven to be useful because the calibration of a magnetic-inductive flowmeter is usually performed with the original measuring window frequency and the quality of the calibration for the device decreases with increasing deviation of the new measuring window frequency from the original measuring window frequency.

Another further development of the method is characterized in that a plurality of measuring window frequencies is specified as possible new measuring window frequencies and, when determining the new measuring window frequency, a measuring window frequency is selected from the plurality of specified possible new measuring window frequencies. Preferably, calibration data for one or more of the measuring window frequencies is also specified as possible new measuring window frequencies, so that the measuring operation is then continued with the associated calibration data.

Alternatively to the selection from several possible new measuring window frequencies which are specified, the new measuring window frequency is determined on the basis of a calculation taking into account the specified critical frequency distance and the determined interference peak frequency.

Preferred designs of the method are characterized in that the magnetic field generator is used to periodically switch the orientation of the magnetic field with a switching frequency, wherein the measuring window frequency is synchronized with the switching frequency such that a measuring window lies within an interval of constant orientation of the magnetic field. In particular, the size of the measurement window is selected such that the measurement window extends at least within a range of constant field strength of the magnetic field. This mode of operation is the usual operation of most magnetic-inductive flowmeters. The reason is that by switching the magnetic field, the direction of separation of the differently charged or polarized particles or molecules is reversed, so that electrochemical effects, which can lead to falsification of the measured values, are not established. Furthermore, offset voltages of the electrode voltage can be calculated out. If the magnetic field is switched over with the switching frequency, the measuring window frequency cannot be changed independently of the switching frequency of the magnetic field; the switching frequency must be changed accordingly.

In a preferred design of the method, it is therefore provided that, in the presence of a critical measuring situation, the new measuring window frequency is set indirectly by selecting a new switching frequency of the magnetic field. Accordingly, possible new switching frequencies of the magnetic field are then specified, the selection of which automatically also changes the measuring window frequency; the relationship is direct and unambiguous. Everything that has been said before with respect to the handling of the measuring window frequency can in this case also be applied to the switching frequency of the magnetic field.

In a further preferred design of the method, several amplitude spectra of the sampled measuring signals of several measuring windows are averaged and the averaged amplitude spectrum is used for peak detection.

All the designs of the method described so far are also implemented in the magnetic-inductive flowmeter, namely by corresponding design of the control and evaluation unit which performs the corresponding method steps during operation of the magnetic-inductive flowmeter.

BRIEF DESCRIPTION OF THE DRAWINGS

In detail, there are now a multitude of possibilities for designing and further developing the method according to the invention for operating a magnetic-inductive flowmeter and the corresponding magnetic-inductive flowmeter. For this purpose, reference is made to the following description of embodiments in connection with the drawings.

DETAILED DESCRIPTION

Figure 1:
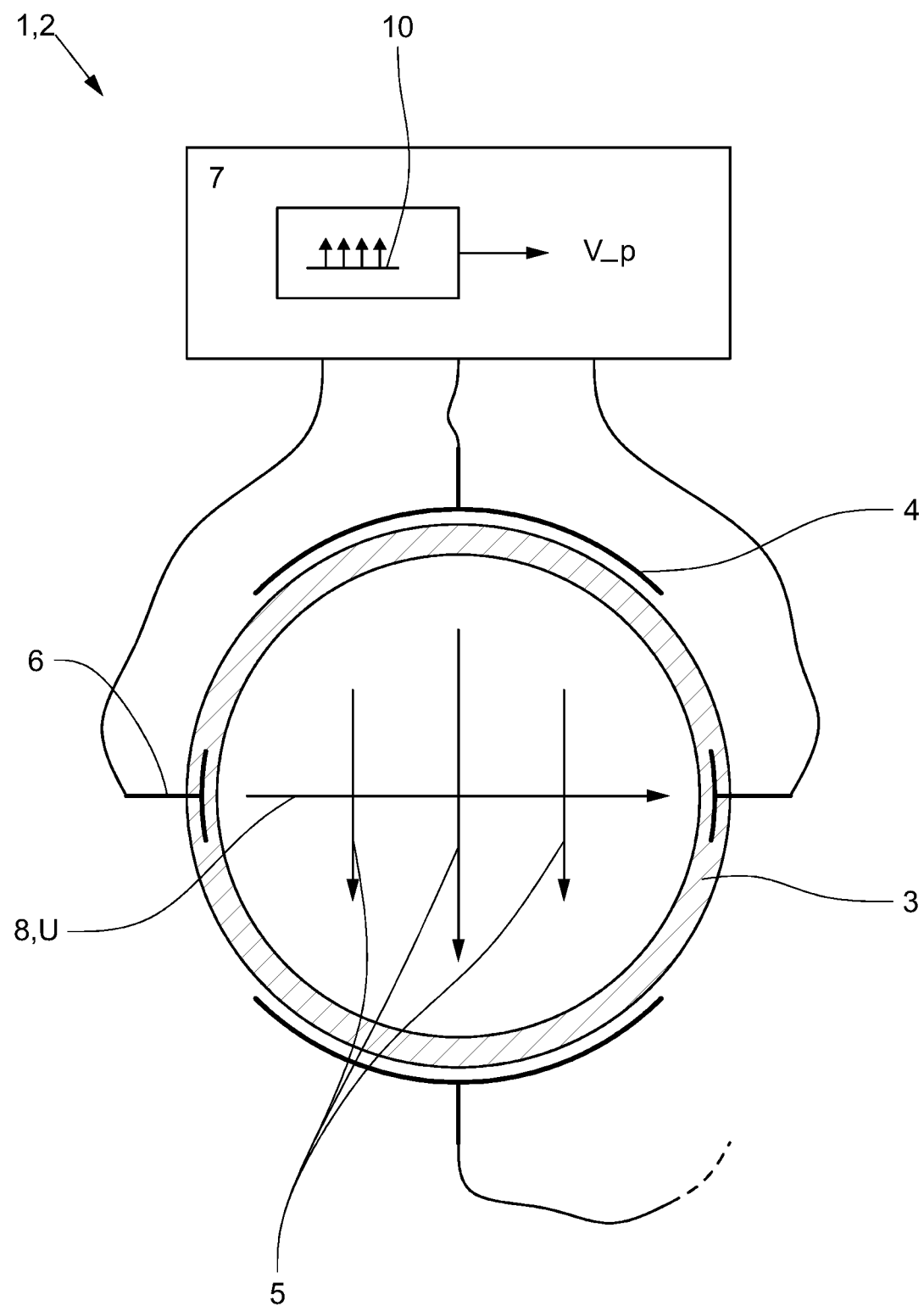
FIG. 1 schematically illustrates a magnetic-inductive flowmeter and a method for operating such a magnetic-inductive flowmeter.

In FIG. 1, a method 1 for operating a magnetic-inductive flowmeter 2, and in particular a magnetic-inductive flowmeter 2 with its essential components, is shown schematically, namely with a measuring tube 3 for guiding a medium, with a magnetic field generator 4 for generating a magnetic field 5 passing through the measuring tube 3 perpendicular to the direction of flow of the medium, with a pair of electrodes 6 for tapping an electrical voltage induced in the medium in the measuring tube 3 as a measuring signal 8, U and with a control and evaluation unit 7 for determining a flow measurement value V_p from the measuring signal 8, U, wherein the measuring signal 8, U is sampled several times in a measuring window 9 periodically repeating at a measuring window frequency f_w and at least one averaged flow measurement value V_p is determined from the repeatedly sampled measuring signals 10 from at least one measuring window 9.

The method 1 described below is implemented in the control and evaluation unit 7, usually by programming corresponding electronic components, such as a microcontroller or a digital signal processor. In addition, the control and evaluation unit usually comprises further known steps of signal processing, such as high-impedance tapping and amplification of the raw measuring signal from the electrodes, low-pass filtering of the measuring signals to avoid aliasing, etc.; however, this is not the main focus here.

Figure 2:
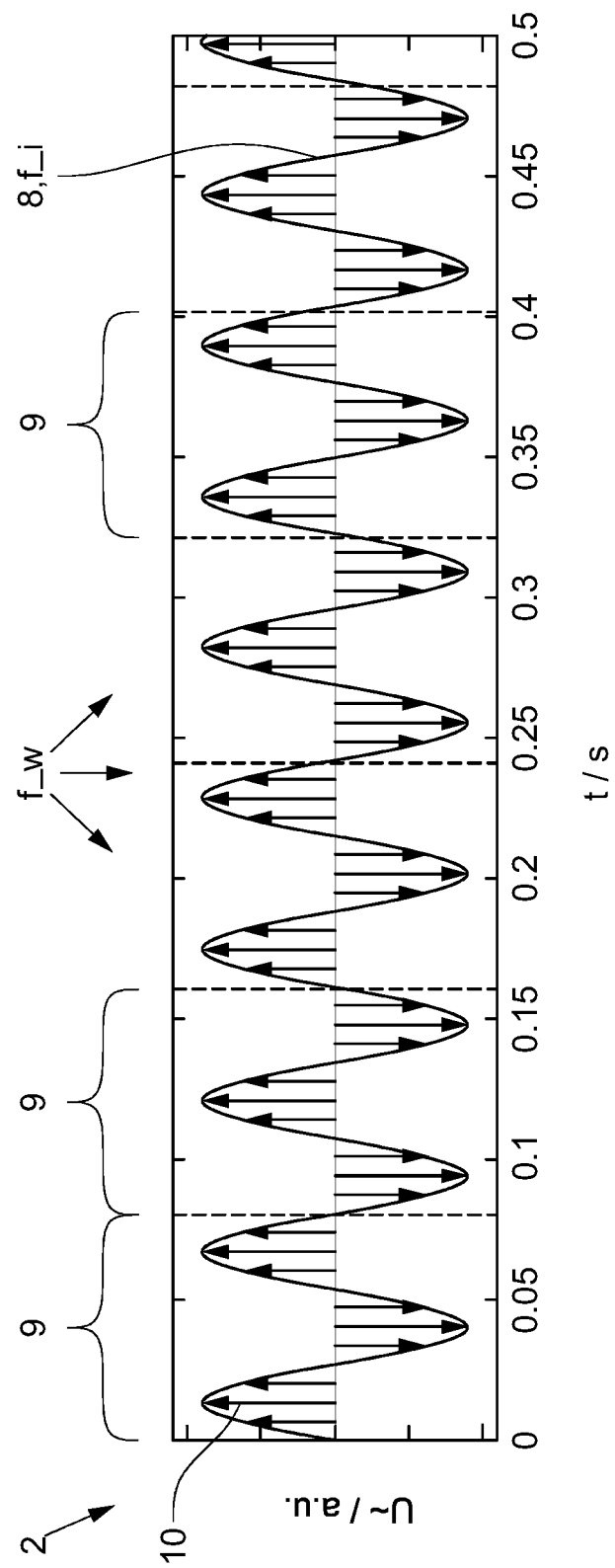
FIG. 2 illustrates a pulsating superimposed signal component on the measuring signal, wherein the measuring signal is cleaned of its DC component, as well as measuring windows for the time limitation of the sampling of the measuring signal.

FIG. 2 shows schematically a superimposed pulsating measuring signal U~ of the measuring signal 8, without the DC component of the measuring signal 8, which is tapped from the medium as an induced electrical voltage U by the pair of electrodes 6; the omission of the DC component serves to clarify the effect of interest here. Furthermore, the measuring window 9 periodically repeating with the measuring window frequency f_w is also shown, wherein a switching of the magnetic field 5 has been disregarded here for the time being.

The pulsation in the flow rate is caused here by a pump, which in principle actually generates a fluctuation in the flow rate, so the pulsating flow rate is by no means faulty, but corresponds to the actual conditions. However, the relatively high frequency superposition does not change the average flow rate, which is actually only of interest and usually does not appear in the time frame of the determination of an averaged flow measurement value V_p, except in the special situation when the measuring window frequency f_w (or the switching frequency f_m of the magnetic field, as will be explained below) is just close to a multiple of the superimposed pulsating fluctuation of the measuring signal 8. Within a measuring window 9 a plurality of sampled measuring signals 10 are obtained by sampling the analog measuring voltage U. For example, by averaging these sampled measuring signals 10, the flow measurement value V_p is then obtained.

FIG. 2 clearly shows the occurrence of a beat problem. If the superimposed oscillations of the measuring signal 8 are within a measuring window 9 from measuring window 9 to measuring window 9 with a large phase offset within the measuring windows 9, then the mean value of the samples 10 jumps from measuring interval to measuring interval around the (not shown) equal value of the measuring signal 8 and no problem arises; this situation is shown in FIG. 2. In connection with the invention it has been recognized that a problem in the form of a measurement-based beat arises when the superimposed oscillation of the measuring signal 8 propagates only with slow change from measuring window 9 to measuring window 9, i.e. when the frequency of the superimposed oscillation of the measuring signal 8 is close to a frequency multiple of the measuring window frequency f_w.

Figure 3:
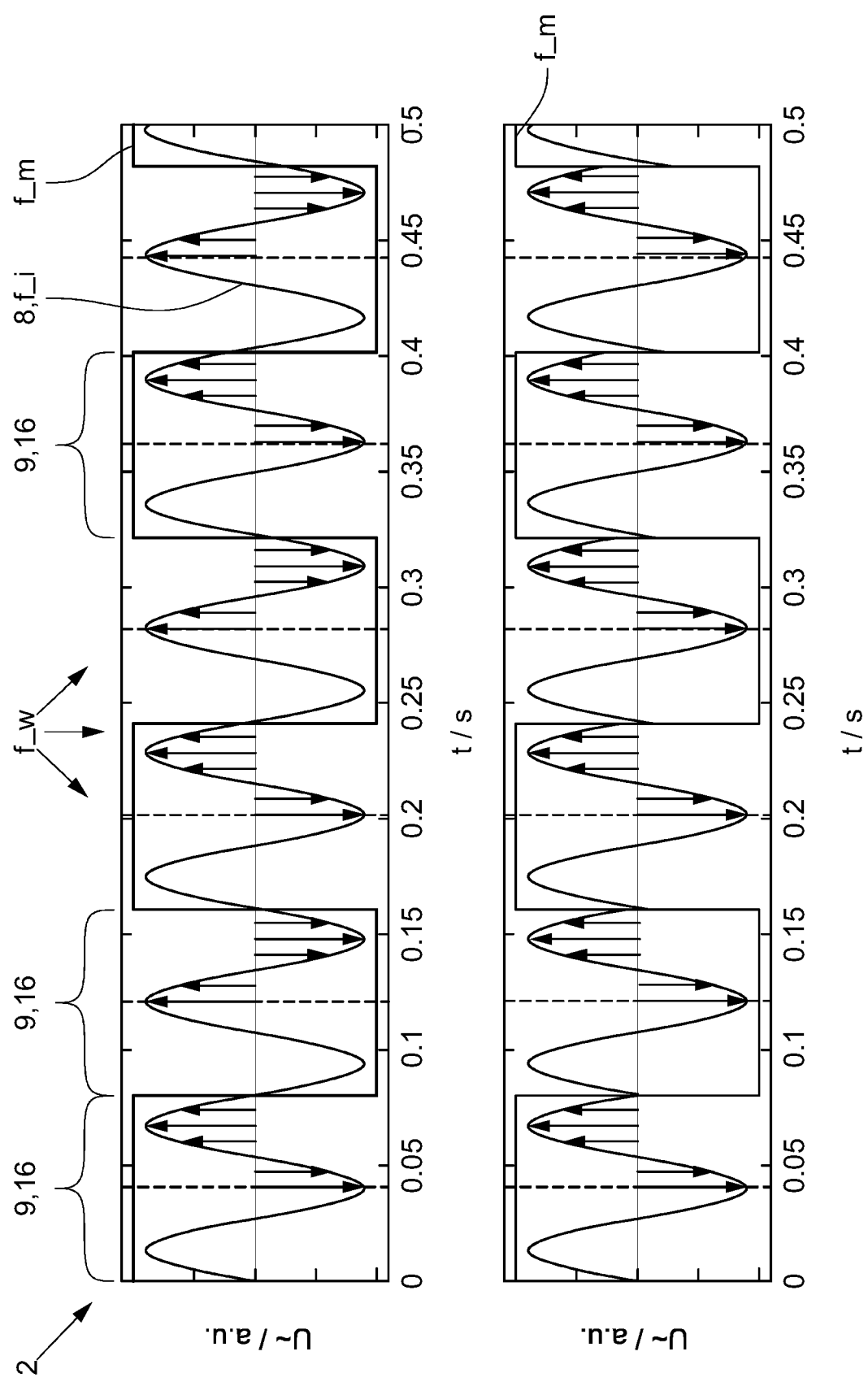
FIG. 3 again schematically illustrates the time course of a superimposed periodic signal component on the measuring signal, also adjusted for the DC component, with a switchover of the orientation of the magnetic field as well as a pronounced beat, which is caused by pulsating pressure fluctuations.

In FIG. 3, two new aspects are shown compared to FIG. 2. The magnetic field generator 4 is used to periodically switch the orientation of the magnetic field with a switching frequency f_m; this is the usual case in the operation of magnetic-inductive flowmeters 1. The measuring window frequency f_w is synchronized with the switching frequency f_m so that a measuring window 9 lies within an interval of constant orientation of the magnetic field 5. In FIG. 3 it can also be seen that it is not the entire time within a magnetic field orientation that is used for capturing sampled measuring signals 10, rather the size of the measuring window 9 is selected in such a way that the measuring window 9 extends in each case in a range 16 of constant field strength of the magnetic field 5, which is why a certain time is waited after the switchover time until sampled measuring signals 10 are collected or are actually also used to determine the flow measuring value V_p.

With the switching of the orientation of the magnetic field 5, the polarity of the induced electrical voltage U tapped with the pair of electrodes 6 also changes, which is why the measuring signals 8, U are used as such in one orientation of the magnetic field 5 and are phase-shifted by 180° in the opposite orientation of the magnetic field 5, which corresponds to a multiplication by −1. The decisive variable for the practical operation of the magnetic-inductive flowmeter is then the switching frequency f_m of the magnetic field, with the change of which the measuring window frequency f_w changes automatically.

FIG. 3 shows in the upper diagram a pulsating superposition in the flow generated by a pump, and in the lower diagram the effect of a pulsating pressure on the measuring signal 8, which is also generated by a pump.

Pulsations in the flow as well as pulsations in the pressure lead to the depicted influence on the measuring signal 8. Since the flow, unlike the pressure, generates a signal following the magnetic field 5 in the measuring signal 5 of the magnetic-inductive flowmeter, pulsations of the flow lead to beat effects if the frequency of the superimposed fluctuating measuring signal (due to the influence of, for example, a pump) is an even multiple of the magnetic field polarity f_m. Pulsations of the pressure, on the other hand, lead to beats if the frequency of the superimposed fluctuating measuring signal (due to the influence of a pump, for example) is an odd multiple of the magnetic field polarity f_m. Accordingly, a fundamental distinction could be made between these two causes. However, since their effects behave in the same way, a distinction is not necessary; they can be countered with the same countermeasures.

FIG. 3 shows an unfavorable case which leads to strong beats, at least in the case of the fluctuations in the measuring signal caused by the pressure fluctuations (bottom). The magnetic-inductive flowmeter is operated with a switching frequency f_m=6.25 Hz (⅛ of 50 Hz) of the magnetic field 5, the pump assumed here generates a pulsation with f_i=18.6 Hz. Thus, the pulsation of the pump is 2.976 times the switching frequency f_m of the magnetic field 5. This is close to three times the switching frequency of the magnetic field 5 and leads to beats. In the lower illustration of FIG. 3, it is easy to see how, in the range 16 of constant field strength of the magnetic field 5 over many measuring windows 9, the superimposed fluctuations in the measuring signal 8 change only slightly and thus lead to a systematic measuring error over many period durations of the measuring window 9.

In order to avoid such errors, the method 1 for operating a magnetic-inductive flowmeter 2 and the correspondingly designed magnetic-inductive flowmeters provide that by means of a frequency analysis 11 of the multiple, sampled measuring signals 10 of at least one measuring window 9—or of the measuring windows 9 within a switching period 1/f_m of the magnetic field 5—an amplitude spectrum 12 of the sampled measuring signals 10 of the measuring window 9—or of the sampled measuring signals 10 of the measuring windows 9 within a switching period 1/f_m of the magnetic field 5—is obtained, in that at least one interference peak 14 in the amplitude spectrum 12 and the associated interference peak frequency f_i are determined by a peak detection 13, i.e. such a peak 14 whose peak frequency f_i is not a multiple of the measuring window frequency f_w—or multiples of the switching frequency f_m of the magnetic field 5. A critical measuring situation 15 is identified by checking whether the determined interference peak frequency f_i falls below a predetermined critical frequency distance f_d to a multiple of the measuring window frequency f_w (or to a multiple of the switching frequency f_m of the magnetic field 5). If a critical measuring situation 15 occurs, a new measuring window frequency f_wn (or a new switching frequency f_mn of the magnetic field 5) is determined and set as the measuring window frequency f_w (or as the switching frequency f_m of the magnetic field 5) so that there is no longer a critical measuring situation 15.

Figure 4:
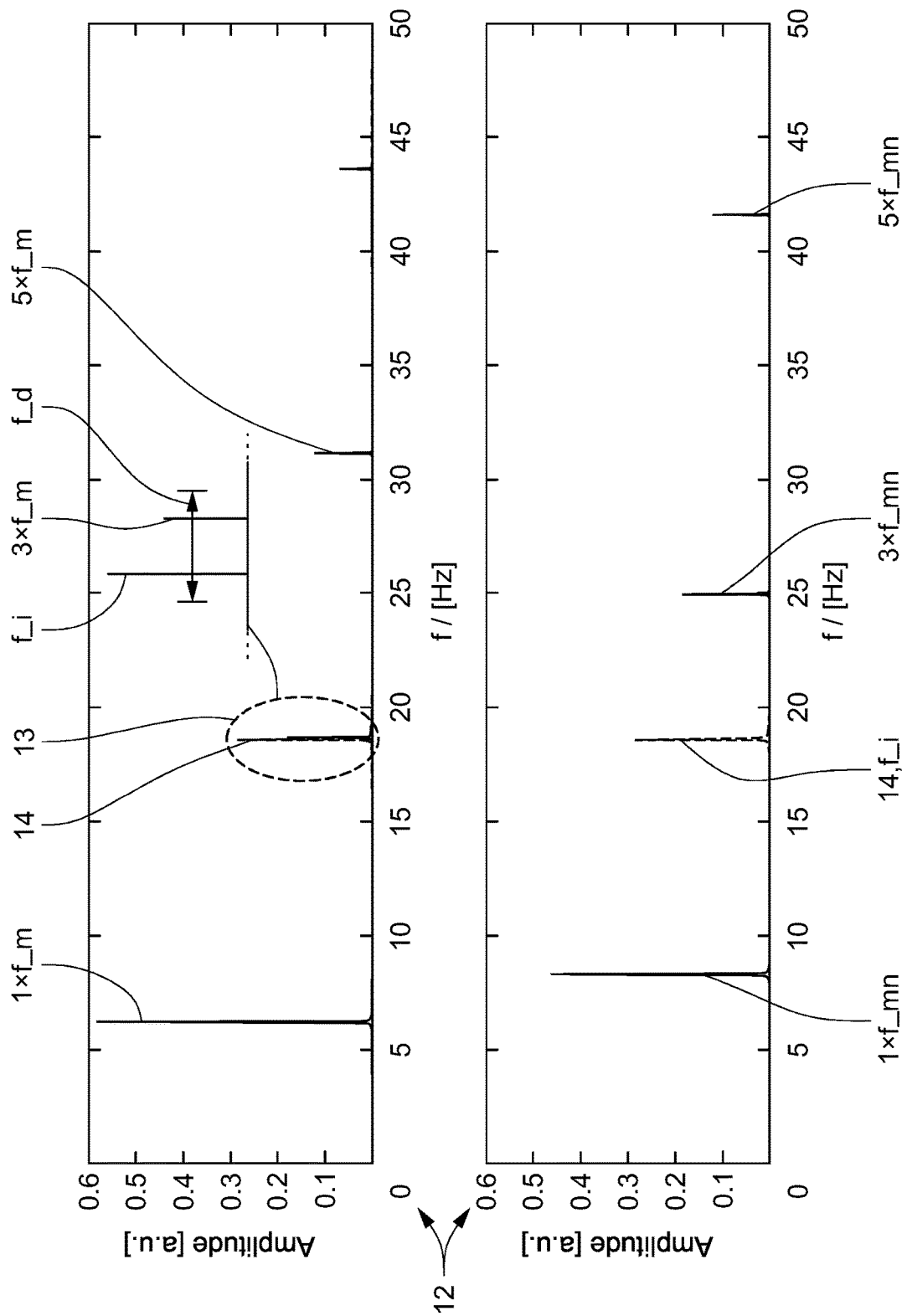
FIG. 4 illustrates a simplified amplitude spectrum to represent the situation of FIG. 3 in the frequency range with a disturbance peak close to an odd multiple of the measuring window frequency or the switching frequency of the magnetic field, as well as the amplitude spectrum after changing the measuring window frequency or the switching frequency of the magnetic field (below).

FIG. 4 shows in the upper illustration in a simplified version the amplitude spectrum 12 obtained by the frequency analysis 11, in which the signal amplitudes are thus plotted over the signal frequency as an illustration of the frequency-dependent energy distribution of the analyzed measuring signal 8. In the upper illustration, the influences of the switching of the magnetic field 5 at odd multiples of the switching frequency f_m of 6.25 Hz can be seen. Close to three times the switching frequency f_m of the magnetic field at 18.75 Hz, the frequency f_i of the pulsating measuring signal component superimposed on the measuring signal 8 is at a frequency of f_i of 18.6 Hz. The proximity of these frequencies leads to beat effects in the sampled measuring signal 10 and thus in the flow measurement value V_p.

In the present example, the check for a critical measurement situation 15 has been performed with a predetermined critical frequency distance of 1 Hz, so there is a critical measurement situation 15.

This has caused a new measuring window frequency f_wn to be determined, in this case indirectly by determining and specifying a new switching frequency f_mn of the magnetic field 5, wherein the switching frequency f_m of the magnetic field has been changed to 8.33 Hz (⅙ of 50 Hz). Therefore, the pulsation is now 2.23 times the new switching frequency f_mn, which is far enough away from the peak frequency f_i and now does not cause disturbing beats. This is shown in the lower plot of FIG. 4 in the frequency domain using the amplitude spectrum 12.

Figure 5:
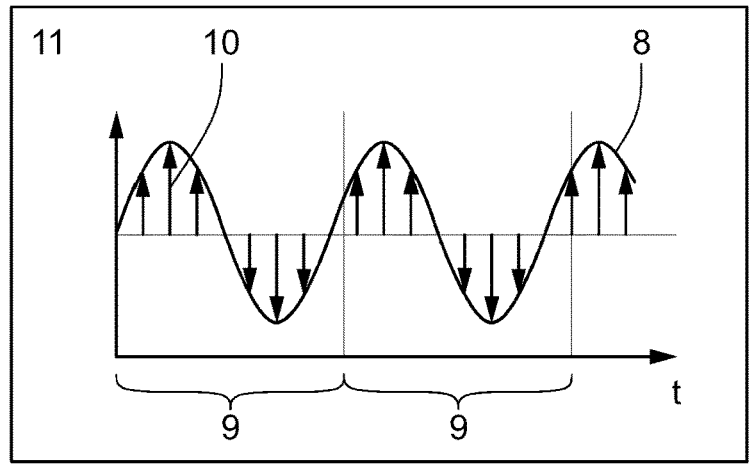
FIG. 5 schematically illustrates the method for operating the magnetic-inductive flowmeter with the steps of sampling the measuring signal, frequency analysis, peak detection, identification of a critical measuring situation and determination and setting of a new measuring window frequency or a switching frequency of the magnetic field.
Figure 5:
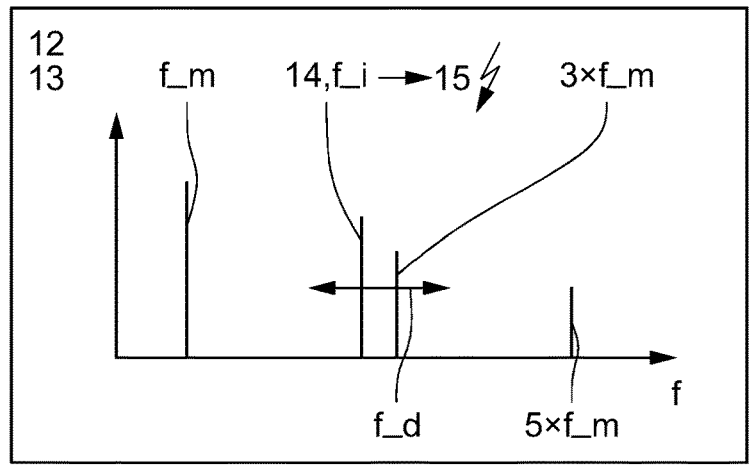
Figure 5:
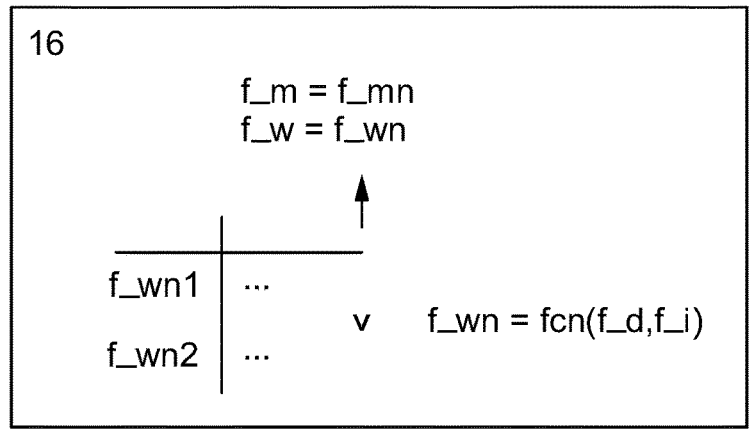

The method 1 is shown again in FIG. 5 in the individual steps. The upper block of FIG. 5 shows that by frequency analysis 11 of the multiple sampled measuring signals 10 of at least one measuring window 9, in this case the measuring windows in a period of unchanged orientation of the magnetic field 5, an amplitude spectrum 12 of the sampled measuring signals 10 of the measuring windows 9 is obtained. The amplitude spectrum 12 is shown in the middle block of FIG. 5.

Based on the amplitude spectrum 12, a peak detection 13 is performed. By means of the peak detection 13, an interference peak 14 in the amplitude spectrum 12 and the associated interference peak frequency f_i are determined in the case shown. This is a peak 14 whose peak frequency f_i is not a multiple of the measuring window frequency f_w or, in this case, the switching frequency f_m of the magnetic field 5.

Also shown in the middle block of FIG. 5 is that a critical measuring situation 15 is identified by checking whether the determined interference peak frequency f_i falls below the predetermined critical frequency distance f_d to a multiple of the measuring window frequency f_w or here the switching frequency f_m of the magnetic field 5, which is the case in the embodiment.

Finally, in the lower block in FIG. 5, it is shown that due to the presence of a critical measuring situation 15, a new measuring window frequency f_wn or, in this case, a new switching frequency f_mn of the magnetic field 5 is determined and set as the measuring window frequency f_w or as the switching frequency f_m of the magnetic field 5, so that there is no longer a critical measuring situation 15.

In the embodiment shown, the check whether the determined disturbance peak frequency f_i exceeds a predetermined critical frequency distance f_d is based on a multiple of the measuring window frequency f_w or to a multiple of the switching frequency f_m of the magnetic field 5, is based on the calculation of the amounts of the differences of the determined interference peak frequency f_i to the multiples of the measuring window frequency f_w or to the multiples of the switching frequency f_m of the magnetic field 5; the amounts of the differences are, in each case, compared with the predetermined critical frequency distance f_d.

In the shown method 1 and the shown magnetic-inductive flowmeter 2, it has been implemented that the new measuring window frequency f_wn or the new switching frequency f_mn of the magnetic field 5 is selected to be greater than the applicable measuring window frequency f_w or greater than the applicable switching frequency f_mn of the magnetic field 5, because it has been increased from 6.25 Hz to 8.33 Hz in the embodiment.

In the lower block of FIG. 5 it is shown that the specification of a new measuring window frequency f_wn or a new switching frequency f_mn of the magnetic field 5 can be implemented in different ways. On the one hand, a plurality of measuring window frequencies f_w or of switching frequencies f_m can be specified as possible new measuring window frequencies f_wn or switching frequencies f_mn, indicated by the table in the lower block of FIG. 5. In determining the new measuring window frequency f_wn or the new switching frequency f_mn, a measuring window frequency f_wn is selected from the plurality of predetermined possible new measuring window frequencies f_wn or a switching frequency f_mn is selected from the plurality of predetermined possible new switching frequencies f_mn and reset for further operation of the magnetic-inductive flowmeter 2.

Another way of determining and specifying a new measuring window frequency f_wn or a new switching frequency f_mn of the magnetic field 5 is that the new measuring window frequency f_wn or the new switching frequency f_mn of the magnetic field 5 is determined on the basis of a calculation taking into account the specified critical frequency distance f_d, indicated by the function f_wn=fcn(f_d, f_i) in the lower block of FIG. 5.

It has proven advantageous that several amplitude spectra 12 of the sampled measuring signals 10 of several measuring windows 9 are averaged and the averaged amplitude spectrum is used for peak detection 13.

Figure 6:
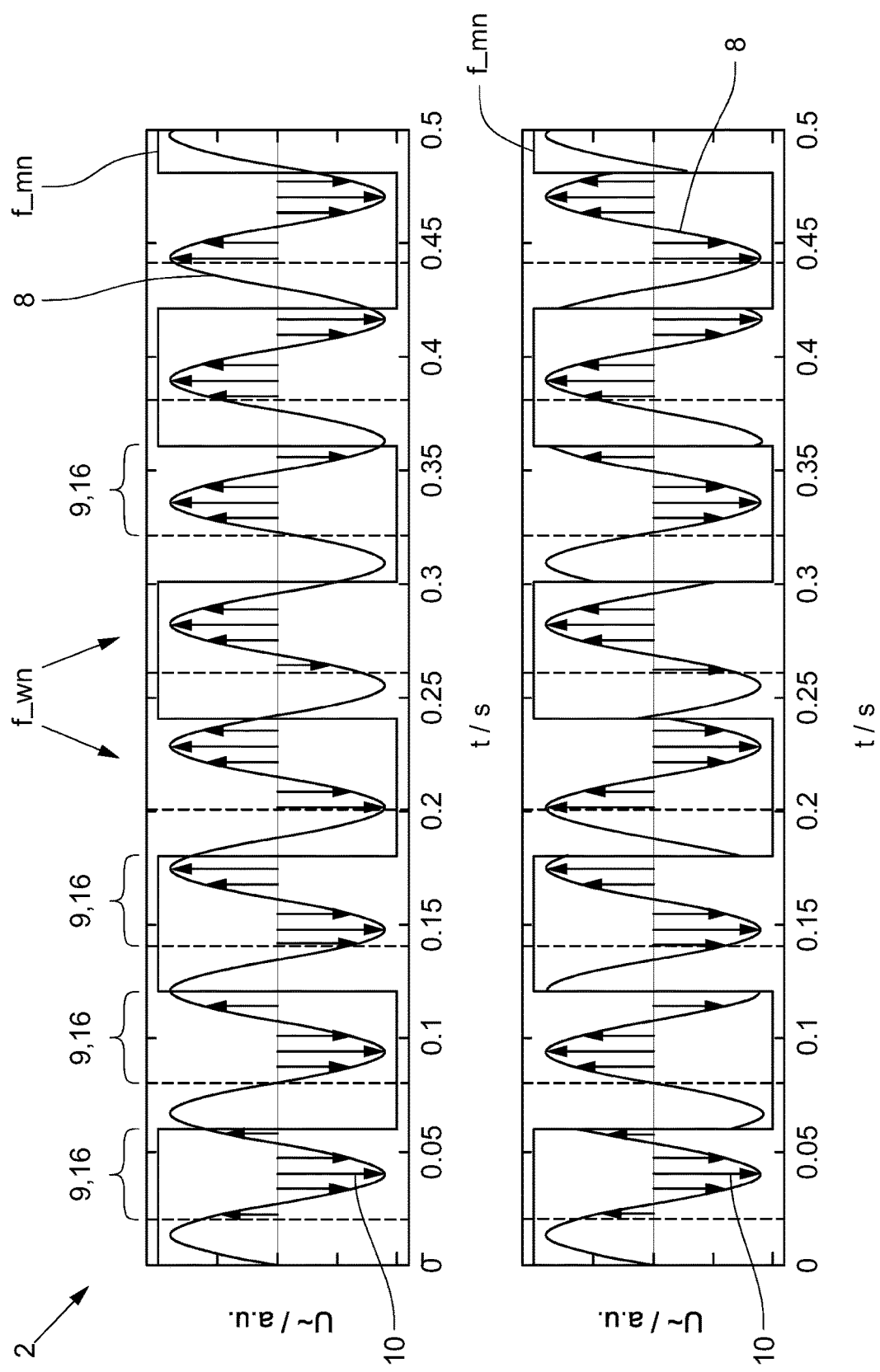
FIG. 6 schematically illustrates in the time domain, the result of the method for operating a magnetic-inductive flowmeter to avoid beat effects in the case of high-frequency pulsating disturbances in the measuring signal in the range of a multiple of the measuring window frequency or the switching frequency of the magnetic field after setting a new measuring window frequency or a new switching frequency of the magnetic field.

In FIG. 6, the result of the application of method 1, which has been explained previously with reference to FIG. 4, below, and with reference to FIG. 5, is also shown in the time domain. It can be seen that at the newly selected measuring window frequency f_wn or at the newly selected switching frequency f_mn of the magnetic field 5, there is no longer any beat effect, i.e. no systematic too high or too low determination of the flow measurement value V_p extending over several measuring window periods or over several switching periods of the magnetic field 5.

The invention claimed is:

1. A method for operating a magnetic-inductive flowmeter with a measuring tube for guiding a medium, with a magnetic field generator for generating a magnetic field passing through the measuring tube perpendicular to the direction of flow of the medium, with a pair of electrodes for tapping an electrical voltage induced in the medium in the measuring tube as a measuring signal induced in the medium in the measuring tube, and having a control and evaluation device for determining a flow measurement value from the measuring signal, wherein the measuring signal is sampled a plurality of times in a measuring window periodically repeating at a measuring window frequency, and at least one averaged flow measurement value is determined from the multiple sampled measurement signals from at least one measuring window, the method comprising:

obtaining an amplitude spectrum of the sampled measuring signals of at least one measuring window by a frequency analysis of the multiple, sampled measuring signals;

determining at least one interference peak in the amplitude spectrum and the associated interference peak frequency by a peak detection, wherein the at least one interference peak has a peak frequency that is not a multiple of the measuring window frequency;

identifying a critical measurement situation is identified by checking whether the determined interference peak frequency falls below a predetermined critical frequency distance to a multiple of the measuring window frequency; and in the presence of a critical measurement situation, determining a new measuring window frequency and setting the new measuring window frequency as the measuring window frequency, so that a critical measurement situation is no longer present.

2. The method according to claim 1, wherein the check as to whether the determined interference peak frequency falls below a predetermined critical frequency distance to a multiple of the measuring window frequency is calculated by calculating the amounts of the differences of the determined interference peak frequency to the multiples of the measuring window frequency, and the amounts of the differences are, in each case, compared with the predetermined critical frequency distance.

3. The method according to claim 1, wherein at least one of:

the predetermined critical frequency distance is selected to be not smaller than ⅕ of the measuring window frequency; and the predetermined critical frequency distance is selected to be not larger than ⅒ of the measuring window frequency.

4. The method according to claim 1, wherein at least one of:

the new measuring window frequency is selected such that it is greater than the applicable measuring window frequency; and at the new measuring window frequency is selected such that it deviates as little as possible from the applicable measuring window frequency.

5. The method according to claim 1, wherein a plurality of measuring window frequencies is predetermined as possible new measuring window frequencies and, when determining the new measuring window frequency, a measuring window frequency is selected from the plurality of predetermined possible new measuring window frequencies.

6. The method according to claim 1, wherein the new measuring window frequency is determined on the basis of a calculation taking into account the predetermined critical frequency distance.

7. The method according to claim 1, wherein the orientation of the magnetic field is periodically switched over with a switching frequency by means of the magnetic field generator, wherein the measuring window frequency is synchronized with the switching frequency in such a way that a measuring window lies within an interval of constant orientation of the magnetic field, wherein the size of the measuring window is selected such that the measuring window extends, in each case, in a range of constant field strength of the magnetic field.

8. The method according to claim 7, wherein, in the presence of a critical measuring situation, the new measuring window frequency is set indirectly by selecting a new switching frequency of the magnetic field.

9. The method according to claim 1, wherein a plurality of amplitude spectra of the sampled measuring signals of a plurality of measuring windows are averaged and the averaged amplitude spectrum is used for peak detection.

10. A magnetic-inductive flowmeter, comprising:
a measuring tube for guiding a medium;
a magnetic field generator for generating a magnetic field passing through the measuring tube perpendicular to the direction of flow of the medium;
a pair of electrodes for tapping an electrical voltage induced in the medium in the measuring tube as a measuring signal; and
a control and evaluation unit for determining a flow measurement value from the measuring signal;
wherein the measuring signal is sampled several times in a measuring window periodically repeating at a measuring window frequency and at least one averaged flow measurement value is determined from the multiple sampled measuring signals from at least one measuring window;
wherein the control and evaluation unit determines an amplitude spectrum of the sampled measuring signals of at least one measuring window in the operating state by means of a frequency analysis of the multiple, sampled measuring signals;
wherein the control and evaluation unit determines at least one interference peak in the amplitude spectrum and the associated interference peak frequency by a peak detection, wherein the at least one interference peak has a peak frequency that is not a multiple of the measuring window frequency;
wherein the control and evaluation unit identifies a critical measuring situation by the control and evaluation unit checking whether the determined interference peak frequency falls below a predetermined critical frequency distance to a multiple of the measuring window frequency; and
wherein the control and evaluation unit determines a new measuring window frequency in the presence of a critical measuring situation and sets it as measuring window frequency so that there is no longer a critical measuring situation.

11. The magnetic-inductive flowmeter according to claim 10, wherein the control and evaluation unit is configured such that at least one of:
the check as to whether the determined interference peak frequency falls below a predetermined critical frequency distance to a multiple of the measuring window frequency is calculated by calculating the amounts of the differences of the determined interference peak frequency to the multiples of the measuring window frequency, and the amounts of the differences are, in each case, compared with the predetermined critical frequency distance;
the predetermined critical frequency distance is selected to be not smaller than 1/25 of the measuring window frequency;
the predetermined critical distance is selected to be not larger than 1/10 of the measuring frequency;
the new measuring window frequency is selected such that it is greater than the applicable measuring window frequency;
the new measuring window frequency is selected such that it deviates as little as possible from the applicable measuring window frequency;
a plurality of measuring window frequencies is predetermined as possible new measuring window frequencies and, when determining the new measuring window frequency, a measuring window frequency is selected from the plurality of predetermined possible new measuring window frequencies;
the new measuring window frequency is determined on the basis of a calculation taking into account the predetermined critical frequency distance;
the orientation of the magnetic field is periodically switched over with a switching frequency by means of the magnetic field generator, the measuring window frequency is synchronized with the switching frequency in such a way that a measuring window lies within an interval of constant orientation of the magnetic field, and the size of the measuring window is selected such that the measuring window extends, in each case, in a range of constant field strength of the magnetic field;
in the presence of a critical measuring situation, the new measuring window frequency is set indirectly by selecting a new switching frequency of the magnetic field; and
a plurality of amplitude spectra of the sampled measuring signals of a plurality of measuring windows are averaged and the averaged amplitude spectrum is used for peak detection.

12. A method for operating a magnetic-inductive flowmeter, comprising:
passing a magnetic field through a measuring tube having a medium flowing therethrough;
tapping a voltage induced in the medium as a measuring signal;
determining a flow measurement value from the measuring signal;
generating measuring signal samples in respective measuring windows that periodically repeat at a measuring window frequency;
determining an averaged flow measurement value from the measuring signal samples;
obtaining an amplitude spectrum of the measuring signal samples by a frequency analysis thereof;
determining an interference peak in the amplitude spectrum and an associated interference peak frequency that is not a multiple of the measuring window frequency;
identifying a critical measurement situation by checking whether the interference peak frequency falls below a critical frequency distance to a multiple of the measuring window frequency; and
in the presence of a critical measurement situation, determining and setting a new measuring window frequency.

* * * * *